(12) United States Patent
Hoff et al.

(10) Patent No.: US 12,325,047 B2
(45) Date of Patent: *Jun. 10, 2025

(54) EXTRUSION METHOD AND APPARATUS

(71) Applicant: ZEPHYROS, INC., Romeo, MI (US)

(72) Inventors: Vincent Hoff, Molsheim (FR);
Christophe Epp, Molsheim (FR)

(73) Assignee: ZEPHYROS, INC., Romeo, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/090,044

(22) Filed: Dec. 28, 2022

(65) Prior Publication Data

US 2023/0201873 A1 Jun. 29, 2023

Related U.S. Application Data

(63) Continuation of application No. 16/913,701, filed on Jun. 26, 2020, now Pat. No. 11,590,530, which is a
(Continued)

(30) Foreign Application Priority Data

Feb. 4, 2011 (GB) ..................... 1102035

(51) Int. Cl.
*B05D 5/00* (2006.01)
*B29C 44/34* (2006.01)
(Continued)

(52) U.S. Cl.
CPC ............ *B05D 5/00* (2013.01); *B29C 44/3484* (2013.01); *B29C 48/022* (2019.02); *B29C 48/266* (2019.02); *B29C 48/2694* (2019.02); *B29C 48/395* (2019.02); *B29C 48/501* (2019.02); *B29C 48/686* (2019.02);
(Continued)

(58) Field of Classification Search
CPC ................................ B05D 5/00; B29C 48/875
See application file for complete search history.

(56) References Cited

U.S. PATENT DOCUMENTS 2,686,335 A 8/1954 Gross
2,958,099 A * 11/1960 Bylsma .................. B29C 48/30
100/904
(Continued)

FOREIGN PATENT DOCUMENTS

DE 1704824 A1 5/1971
DE 2754877 2/1979
(Continued)

OTHER PUBLICATIONS

Frankland. How Much L/D Do you really Need? Plastics Technology, Dec. 2011 pp. 89-90 (Year: 2011).*
(Continued)

*Primary Examiner* — Cachet I Proctor
(74) *Attorney, Agent, or Firm* — The Dobrusin Law Firm, P.C.

(57) ABSTRACT

Improvements in the extrusion of thermohardenable materials are achieved by cooling the material in the initial zone of the extruder and reducing residence time by use of a prescribed length to diameter ratio and screw speed, particularly useful for intermittent application during robotically controlled mass production.

18 Claims, 4 Drawing Sheets

Related U.S. Application Data continuation of application No. 13/982,080, filed as application No. PCT/EP2012/000437 on Feb. 1, 2012, now abandoned.

(51) Int. Cl.

| | | |
|---|---|---|
| *B29C 48/00* | (2019.01) | |
| *B29C 48/25* | (2019.01) | |
| *B29C 48/395* | (2019.01) | |
| *B29C 48/50* | (2019.01) | |
| *B29C 48/685* | (2019.01) | |
| *B29C 48/80* | (2019.01) | |
| *B29C 48/87* | (2019.01) | |
| *B29C 48/875* | (2019.01) | |
| *B29C 44/50* | (2006.01) | |
| *B29C 48/07* | (2019.01) | |
| *B29C 48/155* | (2019.01) | |
| *B29C 48/285* | (2019.01) | |
| *B29C 48/625* | (2019.01) | |
| *B29C 48/79* | (2019.01) | |
| *B29C 48/86* | (2019.01) | |
| *B29K 101/10* | (2006.01) | |
| *B29K 105/00* | (2006.01) | |
| *B29K 105/04* | (2006.01) | |
| *B29K 105/24* | (2006.01) | |

(52) U.S. Cl.
CPC .......... *B29C 48/834* (2019.02); *B29C 48/875* (2019.02); *B29C 44/50* (2013.01); *B29C 48/07* (2019.02); *B29C 48/155* (2019.02); *B29C 48/288* (2019.02); *B29C 48/625* (2019.02); *B29C 48/79* (2019.02); *B29C 48/832* (2019.02); *B29C 48/865* (2019.02); *B29C 2948/92561* (2019.02); *B29C 2948/9259* (2019.02); *B29C 2948/92704* (2019.02); *B29C 2948/92809* (2019.02); *B29C 2948/92876* (2019.02); *B29C 2948/92885* (2019.02); *B29C 2948/92904* (2019.02); *B29C 2948/92971* (2019.02); *B29K 2101/10* (2013.01); *B29K 2105/0097* (2013.01); *B29K 2105/04* (2013.01); *B29K 2105/246* (2013.01); *B29K 2995/0002* (2013.01)

(56) References Cited

U.S. PATENT DOCUMENTS

| | | | |
|---|---|---|---|
| 3,526,929 A | | 9/1970 | Coupland |
| 3,579,728 A | * | 5/1971 | Reid ............... B01J 19/0006 422/138 |
| 3,767,754 A | * | 10/1973 | Manning et al. ....... B29C 48/82 264/211.23 |
| 3,870,284 A | | 3/1975 | Kruder |
| 4,032,501 A | * | 6/1977 | Schulz ............... C08J 3/215 524/554 |
| 4,178,337 A | | 12/1979 | Hall et al. |
| 4,330,214 A | | 5/1982 | Willert |
| 4,569,595 A | * | 2/1986 | Maillefer ............... B29C 48/83 366/149 |
| 5,358,397 A | | 10/1994 | Ligon et al. |
| 5,750,061 A | | 5/1998 | Farina et al. |
| 5,889,114 A | * | 3/1999 | Statz ............... C08L 23/08 525/166 |
| 5,909,958 A | | 6/1999 | Rauwendaal |
| 5,922,425 A | * | 7/1999 | Greuel ............... B32B 27/30 427/407.1 |
| 6,025,028 A | * | 2/2000 | Asrar ............... B29C 48/05 428/537.1 |
| 6,210,030 B1 | | 4/2001 | Ibar |
| 6,328,919 B1 | | 12/2001 | Pham et al. |
| 6,506,447 B1 | | 1/2003 | Hirsch |
| 6,919,203 B2 | | 7/2005 | Chisari |
| 2002/0032260 A1 | * | 3/2002 | Musa ............... C08G 18/6715 524/285 |
| 2003/0140671 A1 | * | 7/2003 | Lande ............... B29C 48/04 72/46 |
| 2004/0262810 A1 | * | 12/2004 | Barz ............... B29C 43/027 264/259 |
| 2006/0127584 A1 | * | 6/2006 | Lande ............... B29C 48/155 427/355 |
| 2012/0082784 A1 | * | 4/2012 | Ou ............... B29C 48/355 427/208.2 |

FOREIGN PATENT DOCUMENTS

| | | | |
|---|---|---|---|
| DE | 10224707 | 12/2002 | |
| DE | 10224707 A1 | 12/2002 | |
| EP | 0112290 | 6/1984 | |
| EP | 0112290 A2 | 6/1984 | |
| EP | 1331080 A2 | 7/2003 | |
| EP | 1471105 | 10/2004 | |
| EP | 1582268 A1 * | 10/2005 | ............. B05D 1/265 |
| WO | 2005/002950 A2 | 1/2005 | |
| WO | 2009/091953 A2 | 7/2009 | |
| WO | 2012/104071 A2 | 8/2012 | |

OTHER PUBLICATIONS

International Preliminary Report on Patentability dated Aug. 15, 2013; Appln. No. PCT/EP2012/000437.
International Search Report & Written Opinion dated Oct. 2, 2012; Appln. No. PCT/EP2012/000437.
Chinese Office Action dated Sep. 9, 2015; Appln No. 201280011612.
Frankland, How Much L/D Do You Really Need? Plastics Technology, Dec. 2011, pp. 89-90.
Notice of Opposition for EP2670576, Filed on Jul. 14, 2017.
Great Britain Search Report, Application No. GB 1102035.1 dated Jun. 3, 2011.

\* cited by examiner

EXTRUSION METHOD AND APPARATUS

The present invention relates to improvements in or relating to methods and apparatus for extrusion. In particular the invention relates to the extrusion of relatively low melting temperature materials and especially to materials that are thermally activatable such as thermohardenable and/or foamable at temperatures above the extrusion temperature. The invention is further concerned with extrusion techniques that involve the precise and intermittent extrusion of materials often as thin strips of material where a regular flow of the extrudate is essential. In one embodiment the invention provides a compact readily transportable mini extruder which can be robotically controlled.

The extrusion of low melting thermoactivatable materials presents special difficulties such as blocking and sticking of the material in the barrel of the extruder due to premature melting and/or reaction of the material as it is fed to the extruder and/or in the initial zone of the extruder barrel. Typically the material is fed to the extruder as pellets or granules. The material can also melt unevenly inside the extruder causing sticking and uneven flow leading to an irregular extrudate. This in turn can lead to undesirable high residence time of the material within the extruder barrel which can cause premature activation of the material inside the extruder barrel.

Although not limited to such the invention is particularly concerned with the application of structural adhesives to a series of components such as for example, in the mass production of automobile components such as panels. In such an automated production a series of identical parts are produced and the parts, carrying the adhesive are then employed in the automobile assembly process. In such a process it may be required to apply the adhesive in a particular pattern or array on the component and in doing so it is necessary to stop extrusion once the desired pattern or array of adhesive has been provided on one component, remove the component carrying the adhesive, replace the component with another component and then commence application of the adhesive to the new component. This process is repeated until the required number of components carrying the pattern or array of adhesive have been produced. In certain applications a discontinuous pattern or array may be required and in this instance it may be required to perform intermittent extrusion on a single component.

In such a process when the adhesive is applied by extrusion it is necessary to have a mechanism associated with the extruder whereby the extrusion of the material can be stopped and started as required. This can also lead to increased residence time of the material within the extruder and to pre-reaction and premature hardening and/or foaming of the material in the extruder. The materials are often required as very thin strips or in a discontinuous pattern on the component which requires additional control of the extruder and presents additional processing difficulties.

Mini extruders suitable for applying melt flowable material to components of articles of manufacture are described in United States Patent Application Publication US 2003/0140671. Although such extruders have been useful there are difficulties in their use in that both the throughput of material and the temperature of the material in the extruder are difficult to control which can be due to premature reaction of the material leading to sticking within the extruder. This can lead to irregularities in the size and thickness of the extrudate and can impair the programmed operation of the extruder. All of which results in undesirable short production runs due to the need for frequent stoppages for cleaning.

The present invention provides a method and apparatus which overcomes some or all of these difficulties by reducing the residence time of the material within the extruder and providing enhanced flexibility to control the temperature of the material within the extruder. In addition the size of the equipment is preferably small to enable it to be readily portable from one location to another.

The invention therefore provides a process for the provision of thermally activatable materials on a substrate comprising extruding the material onto the substrate at a temperature below the activation temperature wherein the material is fed to an extruder, the material is cooled within the initial zone of the barrel of the extruder, heating the material to a temperature above the melting point and below the activation temperature of the material in a subsequent zone of the barrel of the extruder and extruding the molten material onto the substrate where it bonds to the substrate and cools to provide thermally activatable material on the substrate.

It is preferred that the residence time of the material within the extruder is less than 10 minutes preferably less than 5 minutes.

In addition it is preferred that the compression ratio of the extruder which is the ratio of the channel depth at the end of the extruder divided by the channel depth in the initial feed zone should be kept low in order to minimise the shear forces on the material in the extruder. Excessive shear can create energy within the material in the extruder leading to sticking and premature reaction of the material. A compression ratio in the range 1.5 to 2 is preferred. In a further preferred embodiment the length to diameter ratio of the extruder is 24 or lower, preferably between 24 and 16, more preferably between 20 and 16. This can reduce the residence time of the material within the extruder. It is also preferred that the extruder operates at between 10 and 50 revolutions of the extruder screw per minute.

In previous systems such as those described in US 2003/0140671 where the length to diameter ratio was about 12 extrusion of three kilograms of material per hour in an extruder of 45 mm diameter at 3 revolutions per minute results in a residence time of at least 10 minutes. According to the present invention the same amount of material can be extruded by an extruder of length to diameter ratio about 20, at 15 revolutions per minute in 3 to 4 minutes.

The material should be cooled in the initial zone of the extruder and then heated preferably at a controlled rate in a subsequent zone of the extruder and also in the extrusion die. In a preferred embodiment the temperature is gradually increased in the heating zone such as by the provision of a plurality of heaters. The selection of temperatures in the various zones will depend upon the nature of the material. Cooling can be achieved by passing a cooling fluid, such as water, around the initial zone of the reactor and we prefer that the temperature of the fluid as it leaves the cooling zone is no greater than 15° C. and preferably in the range 5° C. to 15° C. The optimum length of the cooling zone along the axis of the extruder will depend upon the nature of the material however, we prefer that the length is from two times to five times the diameter of the extruder barrel.

As the material passes from the initial cooling zone it is heated within the next zone of the barrel of the extruder to its melting temperature and again the temperatures that should be employed in the heating zone of the barrel of the extruder depends upon the nature of the material. The remainder of the barrel may be heated differentially so as to gradually bring the material to the desired extrusion temperature. Typical extrusion temperatures are in the range of 60° C. to 120° C. By way of example a first heating zone may be at a temperature in the range 20° C. to 40° C., a second heating zone may be at a temperature in the range 40° C. to 80° C. and a final heating zone may be at a temperature in the range 80° C. to 120° C. which can also be employed in the extrusion die. In a preferred system there are three separate heating zones along the barrel of the extruder and a separate heating system is provided for the nozzle and extrusion die.

Where the present invention involves the intermittent extrusion of materials the direction of rotation of the screw of the extruder is reversible and is preferably reversed when it is desired to stop extrusion, this reversal helps to make a clean break in the extrudate and results in a well defined end of the extrudate on the component to which it has been applied. The reversal of the screw can be synchronised with the deposition of the extrudate on the substrate to ensure the desired pattern or array of the extrudate is produced. Where a discontinuous pattern is required the screw may be reversed and reactivated one or more times during the application to a single component.

In another embodiment the invention provides an extruder comprising a feed section, a barrel providing a feed section employing compression and movement of the material wherein the initial section of the barrel is cooled and is provided with grooves and the subsequent section of the barrel is heated.

The drive for the extruder may be programmed to provide intermittent extension and application of the low melting thermoactivatable material, for example the extruder screw may be reversed to stop the feed of material to the extrusion die and, in certain instances, to suck back material thus making a clean break of the extrudate.

The extruder is provided with cooling means at the initial section and it is preferred that this section extends for from two to five times the diameter of the barrel. Any suitable cooling means may be employed although we prefer to provide a jacket of cooling fluid and we prefer to operate in a manner that the temperature of the fluid leaving the cooling jacket does not exceed 15° C., preferably it does not exceed 10° C.; water may be used as the cooling fluid. The remaining section of the barrel is heated and the temperature again depends upon the nature of the material being extruded.

However, for the processing of thermohardenable materials employed in the automobile industry we prefer to gradually increase the temperature to an extrusion temperatures in the range 60° C. to 120° C. It is also preferred that the extruder is operated in a manner that the residence time of the material in the barrel of the extruder is less than 10 minutes, preferably less than 5 minutes. When operating with certain materials this can be accomplished by operating the extruder at a speed of from 10 to 50 revolutions per minute.

In a further embodiment when the extruder is to be used to apply a thin strip of material onto a substrate a small gap may be provided between the end of the screw of the extruder and the substrate and the extruder can be programmed so that the gap is filled immediately prior to the desired commencement of extrusion and the material can be sucked back into the gap when extrusion is to be terminated albeit temporarily.

The nature of the extrusion die will depend upon the desired form of the extrudate. However, for the preferred application of thin strips of material a heated thin slot die is preferred. The die can be mounted at any angle and for certain applications it could be inclined at a downward angle relative to the barrel of the extruder. The die is preferably provided with a heating unit.

The present invention allows improved control of the flow rate of the material within the extruder. In a preferred embodiment to further improve the control of the flow rate the initial section of the extruder barrel is provided with grooves and at least the initial section of the grooved section is cooled to prevent the material that is fed to the initial section from melting. Without grooves the maximum flow rate that can be achieved is less than when grooves are provided. For example with an extruder capable of operating at a screw speed of above 60 RPM with no grooves the maximum flow rate that can be achieved may be at 60 RPM after which it declines. However the provision of grooves in the initial section can allow the flow rate to be increased by increasing the revolutions of the extruder screw. The material can be conveyed as a solid in the initial section which provides a constant force to move the material through the heated sections of the extruder where it is melted and also through the die as a melt for application to the substrate. This can increase the speed at which the material moves through the extruder. The grooves are preferably equally spaced around the internal diameter of the barrel of the extruder and the preferred number, size and length of the grooves, the cooling temperature and the heating temperatures along the barrel of the extruder will depend upon the material that is being extruded. Where the extruder is used for the application of thermohardenable adhesives to automobile components extrusion temperatures of from 60° C. to 120° C. are typical, preferably from 60° C. to 90° C.

The extrusion die is preferably a single component with its own heating system. The nature of the die depends upon the desired shape of the extrudate but the invention is particularly useful for the extrusion of thin strips of material.

The extruder of the present invention may be used with any substrate however, it is particularly useful for the application of patterns or arrays of material onto a substrate such as a component particularly a panel of an automobile. In order to provide the desired pattern or array of material the extruder may be moved in a predetermined manner relative to the surface of the substrate or alternatively, the substrate may be moved relative to the die of the extruder. The process may be robotically controlled and the robot can support and move the extruder while the substrate is static or the robot can move the substrate while the extruder is static. The movement can be programmed to provide the desired pattern or array on the substrate which may be a line. The pattern or array on the substrate may be continuous or discontinuous and the extruder can be programmed to stop and start extruding more than one time on a single substrate. This can be useful if a combination of spot welding and a structural adhesive is to be used to bond substrates together and no adhesive is applied where the spot welds are to be formed. In each embodiment it is preferred that the material be extruded downwards onto the surface of the substrate.

Accordingly in a sequential operation a substrate may be placed on a table beneath the extruder die extrusion commenced and the substrate and/or the die moved relative to each other to provide the desired pattern or array of the extrudate on the substrate which may be continuous or discontinuous. Once the pattern or array is complete the extruder screw may be automatically reversed to stop extrusion and form a clean end of the pattern or array on the substrate. The substrate carrying the extrudate may be removed and replaced with the next substrate and extrusion recommenced to form the deposit on the new substrate. This process may be automated and may be performed robotically and repeated until the desired number of components (coated substrates) have been produced. The process is particularly useful for the provision of thermo hardenable adhesives on automobile components which can be activated to form bonds between components during the automobile assembly process such as at temperatures experienced in paint bake or anticorrosion coat bake ovens.

The substrate may be pre-treated such as by heating, infra red or plasma treatment to improve the adhesion of the extrudate to the substrate.

The extrusion techniques of the present invention may be used for the extrusion of any materials. They are however particularly useful for the extrusion of thermally activatable material at temperatures below that at which they are activate, in particularly thermohardenable epoxy based adhesive systems. Examples of thermal activation may be foaming, crosslinking or curing or a combination of the two. Where a material is to foam under the action of heat it will typically contain a blowing agent which generates the gas required to cause foaming at an activation temperature. The extruder of the present invention may be used to extrude the material at a temperature at which it will adhere to a substrate but which is below that at which the blowing agent is activated. Similarly if the material is thermohardenable and hardening is caused by the activation of a curing agent the extruder can be used to extrude the material at a temperature at which it will adhere to a substrate but which is below that at which the curing agent is activated. The extruder can be used in a similar manner with a material that both foams and cures at elevated temperature.

The invention is therefore particularly useful for the provisions of a pattern or array of a thermoactivatable material on a component for subsequent activation. Examples of such use include the provision of structural adhesives on automobile components such as doors or body and roof panels and at locations where hem flanges are to be produced. The structural adhesives contain crosslinking agents which are activated by heat and they may be foamable according to the use to which they are to be put. Another example is where it is desirable to create a foam such as an acoustic baffle or a sealant. In this instance the desired pattern or array of the foamable material can be applied in an unfoamed state ready for foaming during the subsequent automotive assembly operation. The techniques are equally useful in other industries such as aircraft, railroad vehicles, furniture and the construction industry.

The invention therefore enables improved material flow through the extruder, improved control of the temperature of the material and the production of a uniform extrudate over an extended period of time without the need for stoppages.

The invention is illustrated by reference to the accompanying drawings in which

FIG. 1 is a cross section of an extruder according to the invention showing an extruder barrel (1) divided into four zones (2), (3), (4) and (5). The extruder screw is designated as (6) and the extrusion die at (7). (8) is the feed hopper and (9) is the motor that drives the extruder screw.

Zone (1) is a cooling zone and heaters are provided in zones (2), (3) and (4) to gradually increase the temperature along the barrel, the lines (10) and (11) indicate the grooves formed in the initial cooled section of the barrel of the extruder.

Figure 1:
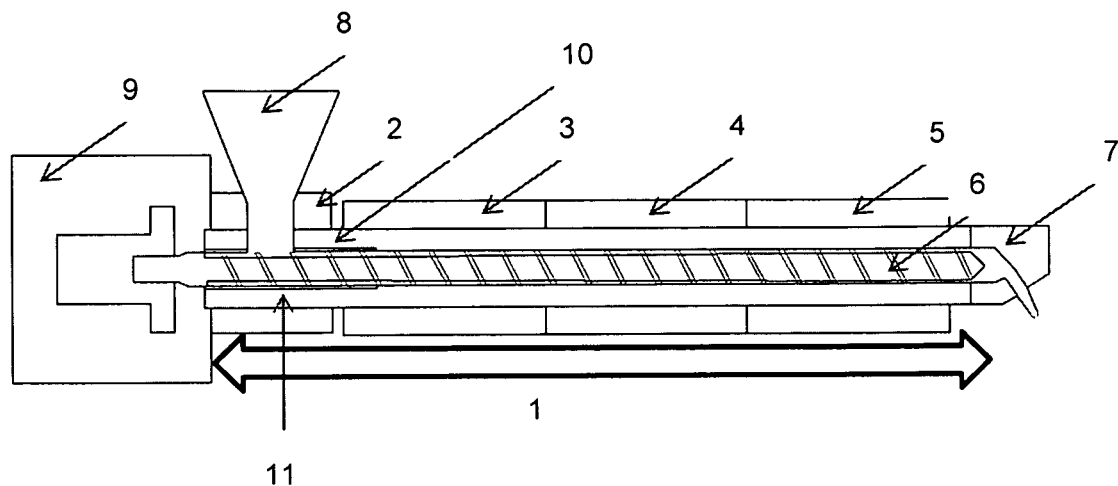
FIG. 1 is a longitudinal cross section of an extruder according to the invention.
Figure 2:
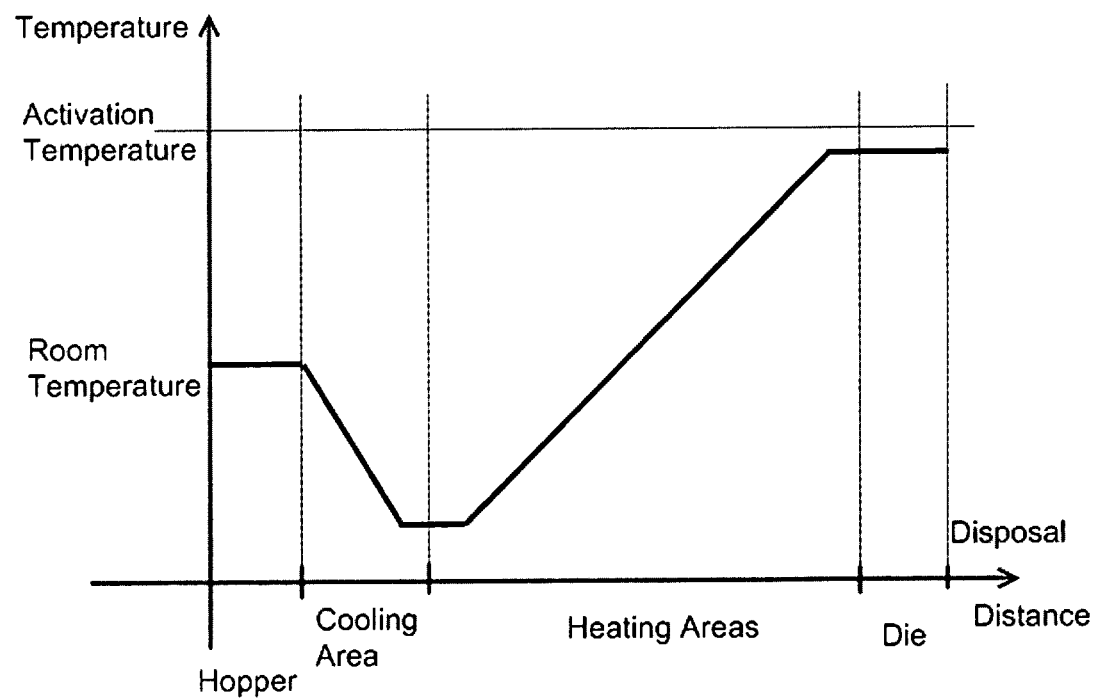
FIG. 2 is a plot showing the operation of the process of the present invention during one cycle of intermittent operation.

FIG. 2 is a plot of a typical temperature profile along the barrel of the extruder. The X axis being the distance along the barrel and the Y axis is the temperature of the material.

Figure 3:
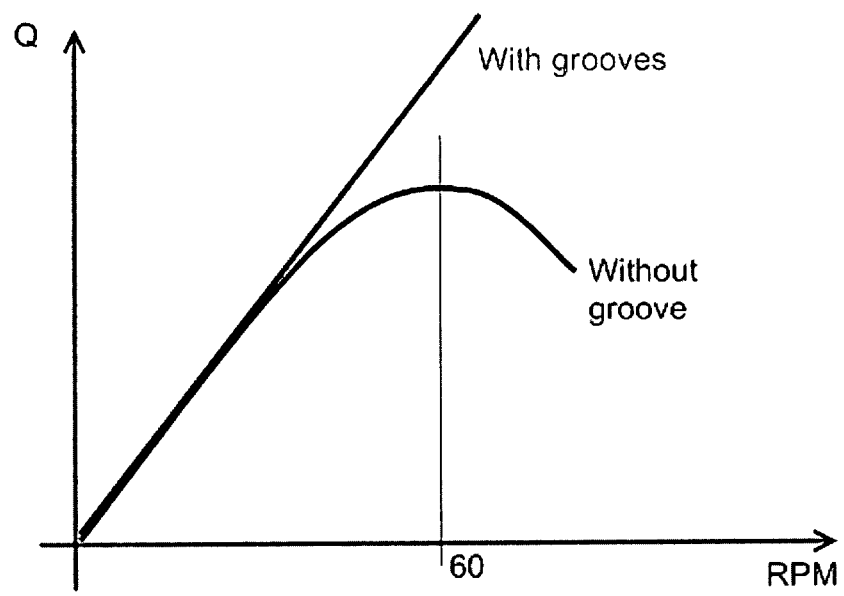
FIG. 3 is a plot showing the effect on material flow rate of providing grooves in the initial section of the extruder barrel.

In FIG. 3 Q is the flow rate of the material within the extruder and RPM is the speed of rotation of the screw of the extruder. The two curves provide a comparison that illustrates the impact of the grooves.

Figure 4:
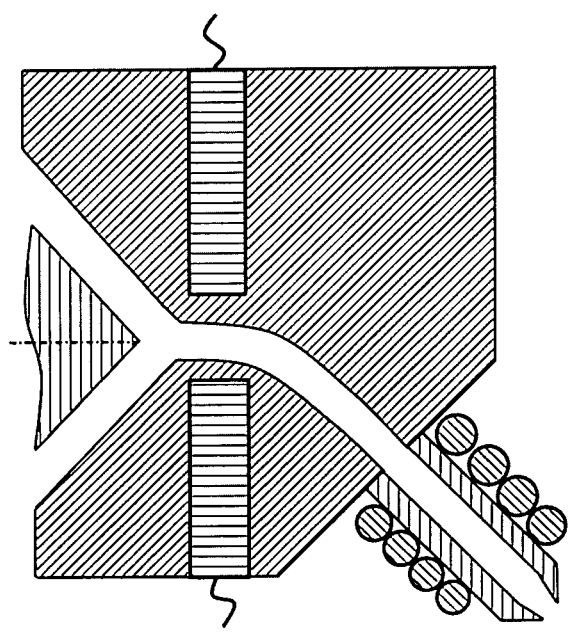
FIG. 4 is a cross sectional view of the extruder nozzle and die.

FIG. 4 shows the extrusion die (7) provided with heaters and mounted in a heated block for attachment to the barrel of the extruder.

Figure 5:
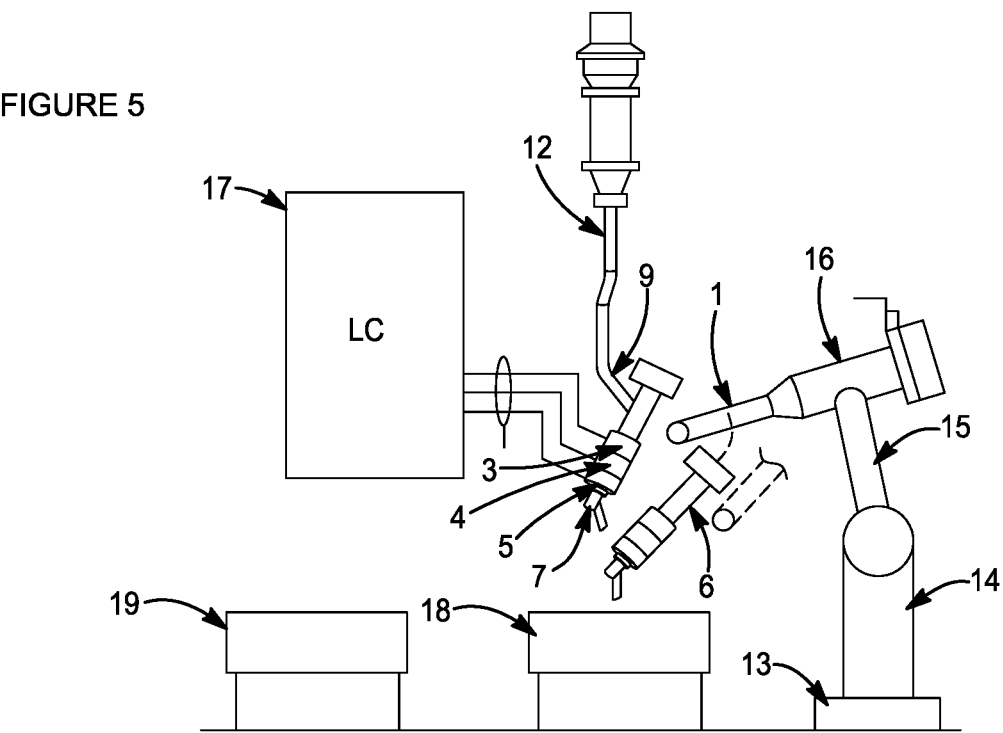
FIG. 5 shows how the extruder may be used to apply material to a series of substrates.

FIG. 5 shows how the extruder may be mounted and automatically controlled to apply an extrudate to a series of substrates. In FIG. 5 the extruder is mounted on a stand (13), (14) and a movement system (15), and (16) is provided. A series of substrates (18), (19) etc can be moved to be below the extrusion die (7) and when in position material can be extruded from the die (7) onto the substrate and the extruder may be moved in a programmed manner to provide the desired pattern of extrudate on the substrate. The section (6) of the extruder is cooled and the temperatures of the three heating zones (3), (4) and (5) are maintained by the controller LC.

Pellets of material may be fed to the hopper (9) of the extruder from bulk storage (12).

Figure 6:
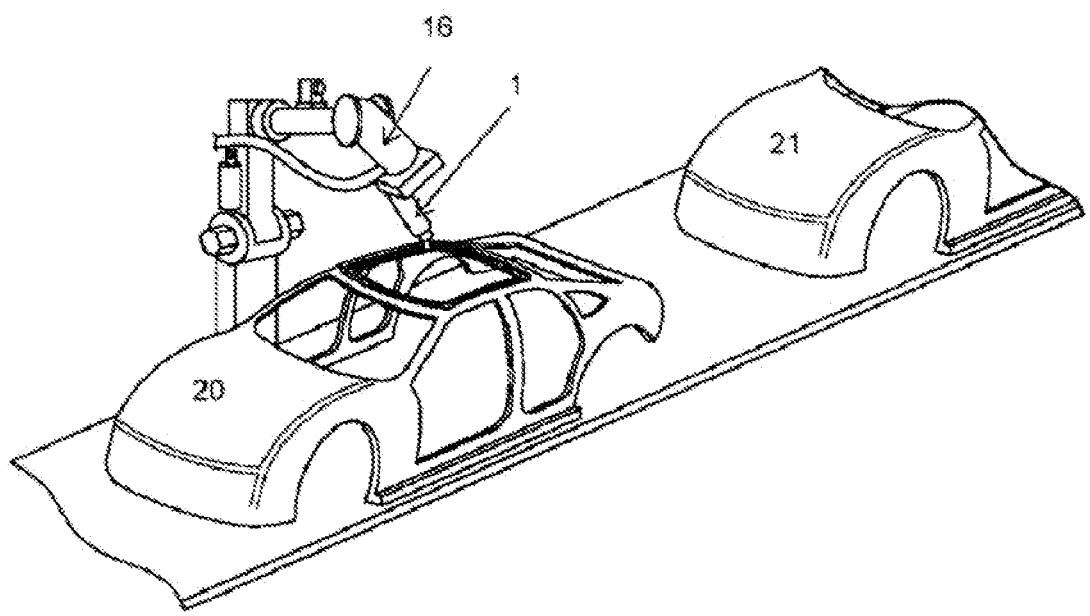
FIG. 6 illustrates how the invention may be used to produce an automotive hem flange on an assembly line.
Figure 7:
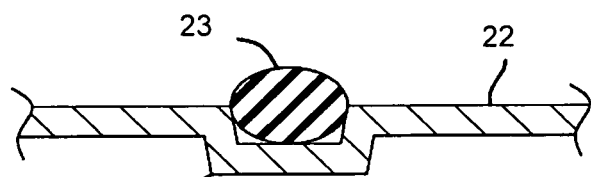
FIG. 7 shows a groove provided in the car body panel for receipt of the extrudate.

FIG. 6 shows how an extrudate may be applied directly to a vehicle body on an automobile assembly line. The extruder (1) being movable above the car components (20, (21) and the component positioned beneath the extruder so that an extrudate of a thermohardenable adhesive may be provided for example for bonding of the roof panel. As shown in FIG. 7 a groove (22) may be provided in the car body panel for receipt of the extrudate (23).

Figure 8:
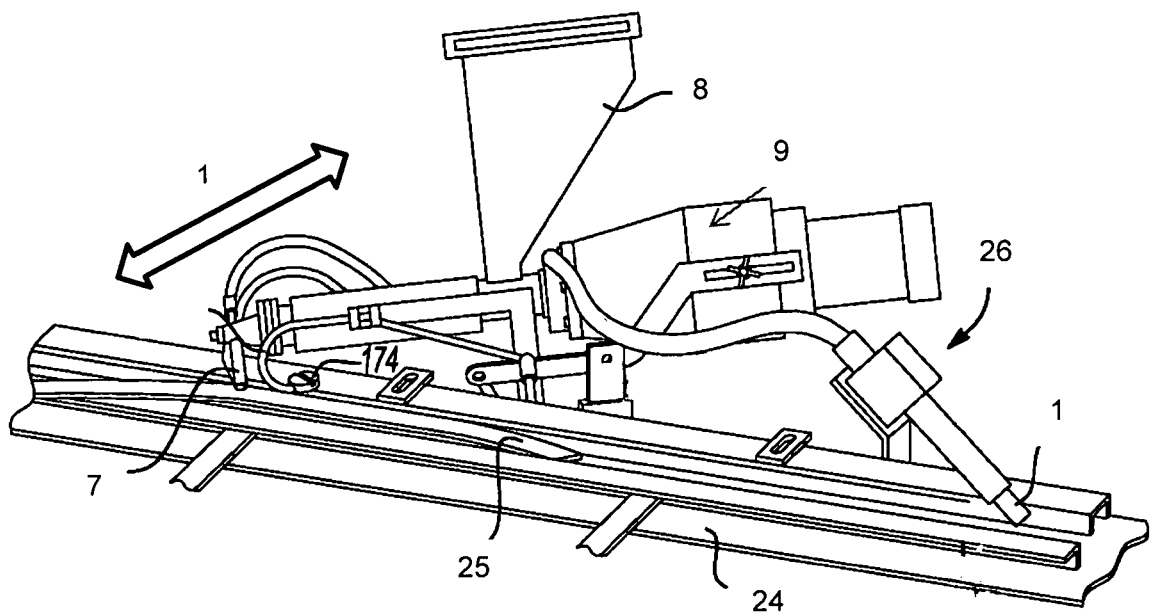
FIG. 8 shows how an extruder of the present invention may be employed to deliver an extrudate to materials on a conveyor belt line.

FIG. 8 shows how an extruder of the present invention may be employed to deliver an extrudate to materials on a conveyer belt line (24) moving from right to left, a series of metal components (as substrates) such as (25) may be moved along the conveyor line and thermoactivatable material extruded onto the component as it passes the extrusion die (7). A device (26) for pretreating the components such as with hot air to improve adhesion to the extrudate is also shown.

The invention is further illustrated by comparison with the use of the method and apparatus described in United States Patent Publication US 2003/0140671. A thermohardenable material comprising a thermoactivable epoxy resin was employed in the apparatus of United States Patent Publication US 2003/0140671 having a heated initial section of the extruder and a length to diameter ratio of 12 with the extruder screw operating at 3 RPM and extruding the material at 90° C. After a few minutes material had built up within the extruder barrel, the extrusion was irregular and it was not possible to operate for more than 20 minutes without the need to stop and clean the extruder.

By comparison when employing the techniques of the present invention with the thermoactivable epoxy resin in which the initial section of the extruder was provided with grooves and was cooled with water to below 15° C. and the length/diameter ratio of the extruder was 20 and the extruder operated at 15 RPM. It was possible to run continuously for at least 40 hours without product build up and blockages.

The invention claimed is:

1. A process for extruding a thermally activatable material onto a substrate comprising:
    (a) feeding the thermally activatable material into an extruder via a feed section, which compresses and moves the thermally activatable material to an extrusion screw;
    (b) moving the thermally activatable material along the extrusion screw, operating at 10 to 50 revolutions per minute, within a barrel of the extruder, the barrel having a length to diameter ratio of 20 to 16, through one or more zones by rotating the extrusion screw;
    (c) passing the thermally activatable material from the extrusion screw through an extrusion die as a molten material; and
    (d) extruding the thermally activatable material onto the substrate at a temperature below an activation temperature, where the thermally activatable material bonds to the substrate and cools;
    wherein the extrusion screw rotates in a clockwise direction and a counterclockwise direction to create a discontinuous pattern or array of the thermally activatable material having one or more gaps free of the thermally activatable material;
    wherein the thermally activatable material is engages with grooves formed in the barrel and;
    equally spaced around an internal diameter of the barrel along a length of the extrusion screw; and
    wherein a residence time of the thermally activatable material in the barrel is less than 10 minutes.

2. The process according to claim 1, wherein the grooves extend along a length of the barrel; and wherein the grooves improve a flow rate of the thermally activatable material relative to a speed of rotation of the extrusion screw.

3. The process according to claim 2, wherein the one or more zones include:
    (i) a first zone in which the thermally activatable material is cooled by a cooling fluid, wherein a length to diameter ratio of the barrel in the first zone is in the range of 2 to 5, and wherein at least a portion of the grooves is located in the first zone;
    (ii) a second zone in which the thermally activatable material is heated to a temperature above a melting point of the thermally activatable material but below the activation temperature of the thermally activatable material;
    (iii) a third zone; and
    (iv) a fourth zone.

4. The process according to claim 3, wherein the third zone and the fourth zone each further gradually heat the thermally activatable material to a temperature above the melting point but below the activation temperature.

5. The process according to claim 4, wherein the extrusion die is a single component with its own heating system; and wherein the extrusion die is mounted to the barrel at a downward angle relative to the barrel.

6. The process according to claim 5, wherein the residence time of the thermally activatable material within the extruder is less than 5 minutes.

7. The process according to claim 6, wherein a compression ratio, defined as a channel depth at an end of the extruder located near the extrusion die divided by a channel depth of the extruder in the first zone, is in a range of 1.5 to 2.

8. The process according to claim 7, wherein the substrate is pre-treated, prior to extrusion, by heating, infra-red treatment, plasma treatment, or a combination thereof.

9. The process according to claim 8, wherein the second zone, the third zone, and the fourth zone each have a separate heating system to heat the thermally activatable material in a controlled manner.

10. The process according to claim 9, wherein the second zone is heated to a temperature in a range of 20° C. to 40° C.

11. The process according to claim 10, wherein the third zone is heated to a temperature in a range of 40° C. to 80° C.

12. The process according to claim 11, wherein the fourth zone is heated to a temperature in a range of 80° C. to 120° C.

13. The process according to claim 12, wherein the first zone is cooled by a cooling jacket containing water as the cooling fluid and a temperature of the cooling fluid leaving the cooling jacket does not exceed 10° C.

14. The process according to claim 13, wherein the thermally activatable material is conveyed as a solid through the first zone.

15. The process according to claim 14, wherein the extrusion die is mounted in a heated block that attaches to the barrel of the extruder that further heats the thermally activatable material prior to extruding the thermally activatable material onto the substrate.

16. The process according to claim 15, wherein the grooves extend along an entire length of the extrusion screw through the one or more zones.

17. The process according to claim 16, wherein a gap exists between an end of the extrusion screw and the substrate prior to the extrusion of the thermally activatable material onto the substrate, and the gap is filled immediately prior to commencement of the extrusion of the thermally activatable material onto the substrate.

18. The process according to claim 17, wherein the thermally activatable material is sucked back into the gap when extrusion is to be terminated.

* * * * *